(12) United States Patent
Chai et al.

(10) Patent No.: US 10,091,114 B2
(45) Date of Patent: Oct. 2, 2018

(54) ASYNCHRONOUS ACCESS AND SYNCHRONOUS TRANSMISSION FOR COEXISTENCE OF WIRELESS STANDARDS

(71) Applicant: NEC Laboratories America, Inc., Princeton, NJ (US)

(72) Inventors: Eugene Chai, Princeton, NJ (US); Karthikeyan Sundaresan, Howell, NJ (US); Mohammad Khojastepour, Lawrenceville, NJ (US); Sampath Rangarajan, Bridgewater, NJ (US); Krishna Garikipati, Ann Arbor, MI (US)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 15/057,272

(22) Filed: Mar. 1, 2016

(65) Prior Publication Data
US 2016/0269941 A1 Sep. 15, 2016

Related U.S. Application Data (60) Provisional application No. 62/131,477, filed on Mar. 11, 2015.

(51) Int. Cl.
*H04W 4/00* (2018.01)
*H04L 12/851* (2013.01)
(Continued)

(52) U.S. Cl.
CPC ............. *H04L 47/24* (2013.01); *H04L 47/14* (2013.01); *H04W 28/12* (2013.01); *H04W 74/0816* (2013.01); *H04W 80/00* (2013.01); *H04L 43/0829* (2013.01); *H04L 43/0852* (2013.01); *H04W 88/10* (2013.01)

(58) Field of Classification Search
CPC ........ H04L 47/14; H04L 47/24; H04W 28/12; H04W 74/0816
See application file for complete search history.

(56) References Cited

U.S. PATENT DOCUMENTS

2007/0153760 A1* 7/2007 Shapira ................ H04B 7/2681
370/350
2007/0238482 A1* 10/2007 Rayzman .............. H04W 74/04
455/552.1

(Continued)

OTHER PUBLICATIONS

Qualcomm Incorporated, "Extending LTE Advanced to unlicensed spectrum", Dec. 2013, pp. 1-12.

*Primary Examiner* — Gregory B Sefcheck
*Assistant Examiner* — Jael Ulysse
(74) *Attorney, Agent, or Firm* — Joseph Kolodka (57) ABSTRACT

Methods and systems of asynchronous access and synchronous transmission include transmitting an initial reservation packet using a first protocol to prevent other devices that use the first protocol from transmitting during a reserved duration. A carrier using a second protocol is activated. Information is transmitted using a second protocol during the reserved duration. During a last subframe of the reserved duration, an additional reservation packet is transmitted using the first protocol to extend the reserved duration. The transmission of the additional reservation packet takes place while the carrier using the second protocol is still active.

10 Claims, 4 Drawing Sheets (51) Int. Cl.
*H04W 28/12* (2009.01)
*H04L 12/801* (2013.01)
*H04W 74/08* (2009.01)
*H04W 80/00* (2009.01)
*H04L 12/26* (2006.01)
*H04W 88/10* (2009.01)

(56) References Cited

U.S. PATENT DOCUMENTS

| | | | | |
|---|---|---|---|---|
| 2008/0119130 A1* | 5/2008 | Sinha | H04W 12/06 | 455/1 |
| 2011/0267978 A1* | 11/2011 | Etemad | H04L 5/003 | 370/254 |
| 2011/0312288 A1* | 12/2011 | Fu | H04B 1/406 | 455/88 |
| 2012/0140743 A1* | 6/2012 | Pelletier | H04W 72/0453 | 370/335 |
| 2012/0281563 A1* | 11/2012 | Comsa | H04W 24/10 | 370/252 |
| 2013/0039351 A1* | 2/2013 | Stephens | H04W 48/02 | 370/336 |
| 2013/0155931 A1* | 6/2013 | Prajapati | H04W 72/044 | 370/311 |
| 2013/0272260 A1* | 10/2013 | Bitran | H04W 16/14 | 370/329 |
| 2014/0126504 A1* | 5/2014 | Jung | H04L 5/0037 | 370/329 |
| 2014/0185497 A1* | 7/2014 | Wolf | H04W 28/26 | 370/294 |
| 2014/0211766 A1* | 7/2014 | Zhao | H04W 72/1215 | 370/336 |
| 2014/0341018 A1* | 11/2014 | Bhushan | H04W 28/0289 | 370/230 |
| 2015/0049709 A1* | 2/2015 | Damnjanovic | H04L 5/0055 | 370/329 |
| 2015/0063148 A1* | 3/2015 | Sadek | H04L 1/20 | 370/252 |
| 2015/0223075 A1* | 8/2015 | Bashar | H04W 16/14 | 370/329 |
| 2015/0250002 A1* | 9/2015 | Sun | H04W 74/0808 | 370/329 |
| 2015/0264699 A1* | 9/2015 | Fwu | H04L 5/001 | 370/329 |
| 2015/0319784 A1* | 11/2015 | Bhushan | H04W 74/08 | 370/329 |
| 2016/0007322 A1* | 1/2016 | Agardh | H04W 72/04 | 370/329 |
| 2016/0020891 A1* | 1/2016 | Jung | H04W 72/0446 | 370/280 |
| 2016/0044516 A1* | 2/2016 | Hedayat | H04W 16/14 | 370/329 |
| 2016/0142920 A1* | 5/2016 | Suzuki | H04W 16/14 | 370/336 |
| 2016/0360554 A1* | 12/2016 | Ko | H04W 74/04 | |

* cited by examiner

ASYNCHRONOUS ACCESS AND SYNCHRONOUS TRANSMISSION FOR COEXISTENCE OF WIRELESS STANDARDS

RELATED APPLICATION INFORMATION

This application claims priority to provisional application 62/131,477, filed Mar. 11, 2015, the contents thereof being incorporated herein by reference.

BACKGROUND OF THE INVENTION

Long-term evolution (LTE) wireless standards are being implemented in the unlicensed spectrum to meet demand from ubiquitous and bandwidth-hungry mobile services and applications. This is achieved through carrier aggregation by expanding the licensed spectrum to include unlicensed channels. However, unlicensed spectrum is currently dominated by consumer-grade wireless networks (e.g., WIFI). The centralized/synchronous access mechanisms used by LTE standards are incompatible with the distributed/asynchronous access mechanisms used by WIFI. In particular, LTE is not designed to yield the channel to WIFI and may potentially starve WIFI networks of bandwidth. In particular, whereas WIFI is distributed and asynchronous, LTE is centrally managed by the base station and synchronous. LTE does not recognize the presence of WIFI devices and will continuously schedule uplink and downlink transmissions, without yielding the channel for WIFI transmissions. WIFI will therefore stay in a constant backoff state and be starved of channel access.

While simple on-off duty cycling mechanisms for unlicensed LTE are being considered by the industry as a solution for channel management, the inherent time- and frequency-domain gaps in LTE transmissions render such mechanisms ineffective. Contrary to conventional wisdom, LTE contains such gaps and therefore fail to provide a continuous source of signal energy even during its active period. These gaps cannot be eliminated without specification changes. The size of the gaps is large enough for WIFI devices to misinterpret them as transmission opportunities, leading to collisions between WIFI and LTE frames during the LTE on-periods, rendering duty-cycling schemes ineffective.

BRIEF SUMMARY OF THE INVENTION

A method implemented in a base station used in a mobile communications system includes transmitting an initial reservation packet using a first protocol to prevent other devices that use the first protocol from transmitting during a reserved duration. A carrier using a second protocol is activated. Information is transmitted using a second protocol during the reserved duration. During a last subframe of the reserved duration, an additional reservation packet is transmitted using the first protocol to extend the reserved duration, said transmission of the additional reservation packet taking place while the carrier using the second protocol is still active.

A base station used in a mobile communications system includes a first network interface configured to transmit an initial reservation packet using a first protocol to prevent other devices that use the first protocol from transmitting during a reserved duration and to transmit, during a last subframe of the reserved duration, an additional reservation packet using the first protocol to extend the reserved duration. A second network interface is configured to activate a carrier using a second protocol and to transmit information using the second protocol during the reserved duration, wherein the carrier remains active during transmission of the additional reservation packet by the first network interface.

DETAILED DESCRIPTION

Embodiments of the present invention implement asynchronous access and synchronous transmission (A2TS) for long-term evolution (LTE) wireless communications on unlicensed channels. A2TS allows an unlicensed LTE transmitter to contend asynchronously for access to the channel in a manner that is efficient and fair to WIFI networks, while preserving compliance with LTE and maintaining the benefits of synchronous transmissions. The present embodiments do not necessitate any change to either the LTE or WIFI specifications and can be readily implemented with off-the-shelf LTE and WIFI platforms.

The present embodiments bridge the gap between LTE and WIFI access modes by using an on-board WIFI-compatible interface to asynchronously negotiate for synchronous transmission periods with any WIFI networks present. Once the WIFI-compatible interface gains access, the interface sends a CTS-to-Self frame (where CTS stands for "clear to send") to notify other WIFI devices in range that the channel is reserved. The asynchronous notification prevents other devices from accessing the channel during the LTE device's transmission gaps. The LTE interface then activates on the unlicensed channel on the same frequency band as the WIFI interface and begins synchronous transmissions to user equipment.

To accomplish this goal, the present embodiments overcome several challenges. First, each activation of an unlicensed channel incurs a large overhead of up to about 10 ms. The present embodiments amortize this overhead over a long channel duration. However, due to limitations of the WIFI standard, each CTS frame can only reserve the channel for 32 ms. Successive CTS frames, meanwhile, would cause self-interference with the LTE transmission. Therefore the present embodiments implement a reservation extension scheme to achieve longer reservation durations without repeated activation of the unlicensed channel.

Second, hidden WIFI terminals may not be able to decode the CTS-to-self frames and may therefore continue to interfere with ongoing LTE transmissions. This problem is exacerbated when LTE transmissions communicate with multiple user devices in a single frame using orthogonal frequency division multiple access (OFDMA), resulting in varied interference/collision levels at the user devices. The present embodiments use a scheduling policy that minimizes the impact of interference from such hidden nodes.

Third, the reservation duration of the present embodiments may be several times larger than the duration of a WIFI frame. Thus, WIFI devices may still be starved for bandwidth. Furthermore, unlike WIFI, each LTE transmission may be a one-to-many transmission. Thus, the standard WIFI backoff policy in response to involving one-to-one transmissions and collisions is not suitable. The present embodiments therefore provide an A2TS-aware backoff mechanism that is designed to maintain fair sharing of the channel with WIFI.

It should be noted that, although the present embodiments are specifically described with respect to LTE and WIFI coexistence, it is contemplated that the present principles may be readily extended to other types of contention, particularly when one specification deals with centralized access and synchronous transmission, while the other deals with distributed access and asynchronous transmission.

Figure 1:
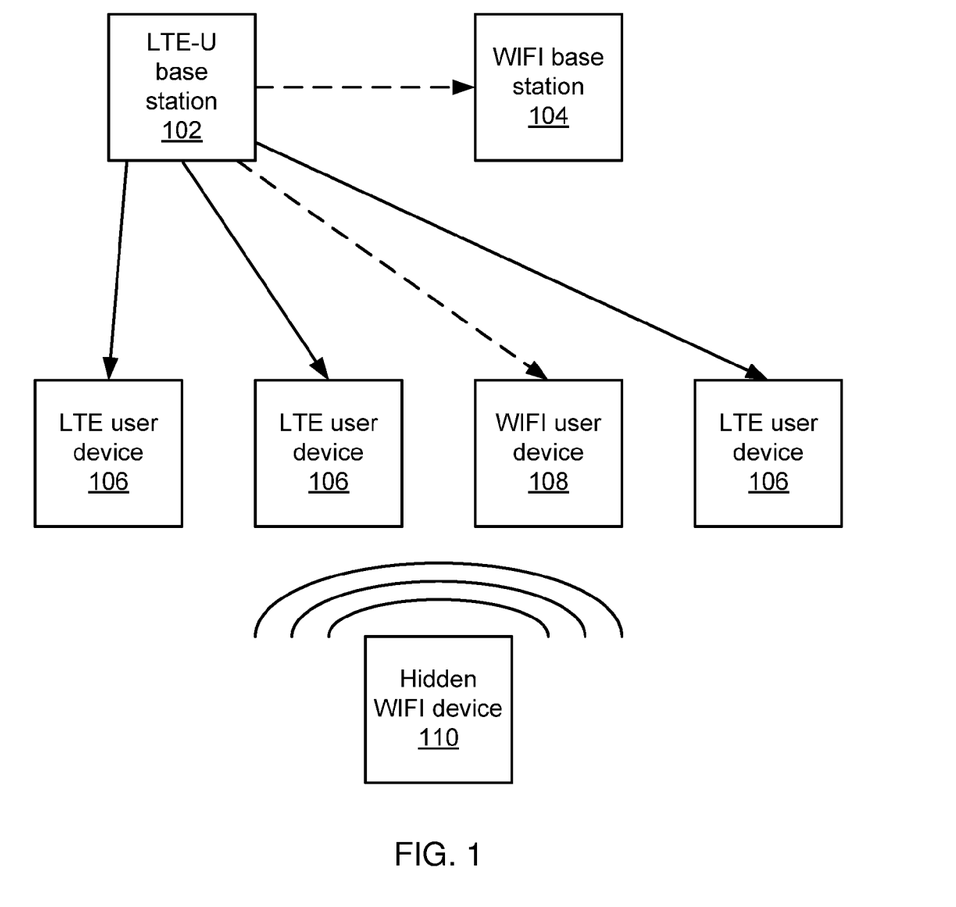
FIG. 1 is a diagram of a system having unlicensed long-term evolution networks and WIFI networks coexisting according to the present principles.

Referring now to FIG. 1, a wireless system is shown that includes both LTE and WIFI devices. In particular, an LTE base station 102 operates on unlicensed channels in contention with a WIFI base station 104. A set of user devices communicate with their respective base stations, with one or more LTE user devices 106 communicating with the LTE base station 102 and one or more WIFI user devices 108 communicating with the WIFI base station 104.

Before transmitting to the LTE user devices 106, the LTE base station 102 communicates with the WIFI base station 104 and any WIFI user devices 108 to reserve the channel. The WIFI devices 104 and 108 then avoid transmitting during the reserved period. However, one or more hidden WIFI devices 110 may also exist and may continue to interfere with the LTE communications.

It should be noted that the present embodiments deal specifically with downlink channels between the LTE base station 102 and the LTE user devices 160. Current proposals for unlicensed LTE operation operate only on the downlink transmissions, with uplink being restricted to licensed portions of the spectrum. However, the present principles apply equally well to uplink transmissions as to downlink transmissions. In addition, while the present embodiments are focused on a single LTE base station 102, it should be recognized that the present principles may be readily extended to a network having multiple LTE base stations 102.

As noted above, there is an overhead in reserving a channel for LTE transmission. In particular, LTE can only activate and deactivate the carrier on a subframe boundary. There is a small gap of up to about 1 ms (the subframe duration) between the CTS-to-self signal and the start of the carrier. After enabling the carrier, there is a further delay of about 8 ms (set out by the LTE specification) before the carrier can be used by user devices to allow the user devices to synchronize to the carrier. As is the case with the activation procedure, deactivation can only occur along subframe boundaries, incurring another time gap of up to 1 ms before the end of the reservation period. The total time gaps therefore represent an overhead of up to about 10 ms.

To amortize this overhead, the LTE base station 102 activates the carrier for a longer time duration (e.g., in the hundreds of milliseconds). As noted above, WIFI notes will continuously back off exponentially during the on-periods and become starved of channel access, as they do not have information on the exact duration of the LTE on-periods. The present embodiments use the CTS-to-Self messages to inform WIFI nodes of the reserved channel duration via the network allocation vector (NAV) field in the CTS frame.

However, two associated problems still arise. Due to the limited NAV field size, a CTS frame can only specify a NAV duration of no more than 32 ms. Since each carrier activation incurs up to 10 ms of overhead, about 30% of each 32 ms channel reservation is potentially unusable. Even if a longer period could be reserved by this mechanism, that would cause a negative impact on latency-sensitive services in WIFI.

To address these concerns, the LTE base station 102 uses successive CTS-to-Self frames to extend the reservation. However, each CTS-to-Self packet after the first may interfere with ongoing LTE transmissions. One solution is to send the CTS-to-Self frame precisely at the end of an LTE transmission. However, this will not only necessitate tight synchronization between the two interfaces, but also a deactivation of the carrier on the LTE interface during the CTS transmission, which would incur another 10 ms penalty upon reactivation.

To overcome this difficulty, the present embodiments do not schedule any data transmission in the last LTE downlink subframe of a current channel reservation, resulting in a significant time gap within the subframe. The contention window size of the WIFI interface is then set to zero so that it does not back off when presented with a chance to access the channel. When the WIFI interface detects a transmission opportunity during the empty data of the last LTE subframe, it immediately sends three CTS-to-Self frames back-to-back (since the contention window size is zero).

The present embodiments thus take advantage of the fact that the smallest gap size between reference signals in the empty downlink LTE subframe is 133.4 µs, while the airtime duration of a WIFI CTS frame is 48 µs. Hence, a transmitted CTS frame can easily fit completely within the time gaps. By transmitting three CTS-to-Self packets consecutively, the present embodiments ensure that at least one of the packets is not interfered with by the reference/control signals from the LTE transmission and can be received correctly at the WIFI base station 104 and WIFI devices 108. After the new CTS-to-Self frames have been sent, the LTE base station 102 continues sending downlink subframes on the same carrier uninterrupted. No deactivation of the carrier on the LTE interface is needed during the reservation extension.

As the reservation duration increases, the relative overhead due to the activation delay and time gaps decreases. If no reservation extensions are used, LTE transmissions may incur up to ten subframes of unused airtime for each carrier activation. With reservation extensions, the present embodiments lose only one subframe for each extension. The cost of the initial activation is amortized over a larger uninterrupted carrier activation duration. If each carrier activation increases the channel reservation by 32 ms, the overhead incurred by the present embodiments can be decreased to below 5%.

This extension can be repeated multiple times to extend the channel reservation. However, the total channel reservation duration is limited by the WIFI beaconing interval. WIFI stations typically transmit beacons every 100 ms. If a WIFI user device 108 misses seven such beacons, it will dissociate from the WIFI base station 104. Hence, the total channel reservation duration of the present embodiments should be kept below 700 ms, with a maximum channel reservation time of 600 ms being particularly contemplated to prevent WIFI disconnections.

While longer channel reservations are desirable to amortize the overhead of activating carriers in LTE, they can have a negative impact on latency-sensitive services over WIFI. However, the present embodiments allow WIFI to leverage its frequency agility to cater to latency-sensitive services. Specifically, the present embodiments take advantage of dynamic channel bonding (i.e., aggregating multiple WIFI channels), available in modern WIFI specifications, to combine primary and secondary WIFI channels. The primary WIFI channel is selected to be one that is not occupied by a neighboring LTE base station 102. When serving latency-sensitive flows, the WIFI base stations 104 will still be able to utilize the primary channels, even if the secondary channels are blocked by an active unlicensed LTE carrier. The WIFI base station 104 will contend with other WIFI base stations 104 in its neighborhood on its primary channel as before and will not incur the long channel reservation delays imposed by efficient LTE operation.

Figure 2:
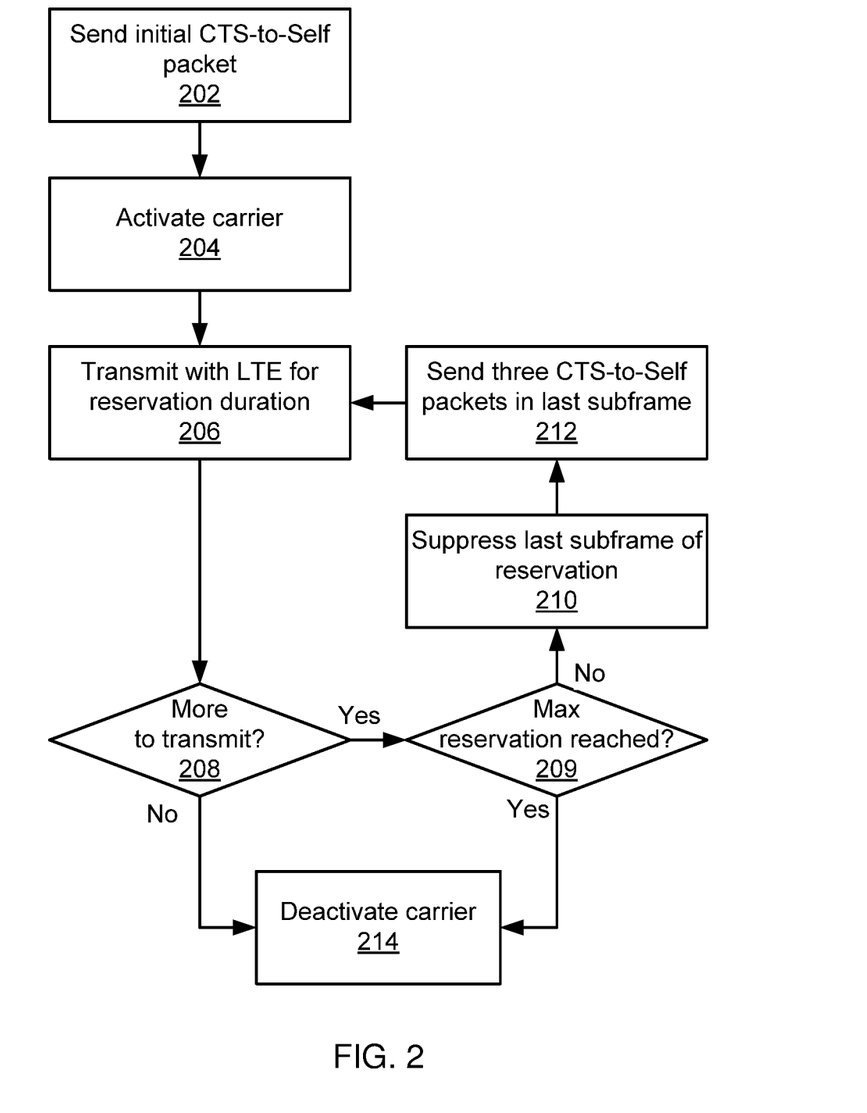
FIG. 2 is a block/flow diagram of a method of reserving transmission time in a WIFI network for unlicensed long-term evolution communications.

Referring now to FIG. 2, a method for LTE channel reservation is shown. Block 202 sends an initial CTS-to-Self packet using a WIFI interface on the LTE base station 102 to prevent WIFI devices from transmitting for the duration of the reservation. Block 204 then activates the LTE carrier and block 206 transmits information to one or more LTE user devices 106 for the duration of the reservation.

Block 208 determines whether the LTE base station 102 has more information to transmit. If not, block 214 deactivates the carrier, allowing other devices to access the channel. If so, block 209 determines whether the maximum reservation duration (e.g., about 600 ms) has been reached. If so, block 214 deactivates the carrier.

If there is more information to transmit and the maximum duration has not been reached, block 210 suppresses the last subframe of the reservation, such that no LTE information other than reference and control signals are transmitted in that time. Block 212 then sends three CTS-to-Self packets back-to-back during the last subframe to establish a new reservation. Block 206 then continues LTE transmission in the new subframe.

As noted above, hidden WIFI terminals 110 may produce unexpected collisions at the LTE user devices 106, particularly if there are multiple such LTE user devices 106. Simply approximating the channel state of all LTE user devices 106 as being the same as that of the LTE base station 102 will produce highly inaccurate channel status conclusions, due to the fact that the hidden WIFI nodes 110 may be out of range of the LTE base station 102 while still interfering with one or more individual LTE user devices 106. The further the hidden WIFI node 110 is from the LTE base station 102, and the closet the hidden WIFI node 110 is to a LTE user device 106, the more likely it is that the hidden WIFI node 110 will interfere with ongoing downlink transmissions. As a result, different LTE user devices 106 will experience different levels of interference from hidden WIFI terminals 110.

The present embodiments address this challenge through intelligent scheduling of transmissions to the LTE user devices 106. The LTE base station 102 identifies LTE user devices 106 that are more susceptible to interference by measuring their frame loss rates and reschedules the user devices 106 with consistently high loss rates on licensed channels, where they will not be subject to WIFI interference. This allows for interference-prone LTE user devices 106 (e.g., those near the cell edge) to receive adequate protection in licensed channels while alleviating the interference they may cause to other WIFI devices (e.g., when the LTE uplink also operates in the unlicensed channel). Those LTE user devices 106 that are less sensitive to interference continue to be scheduled on the unlicensed channels.

Figure 3:
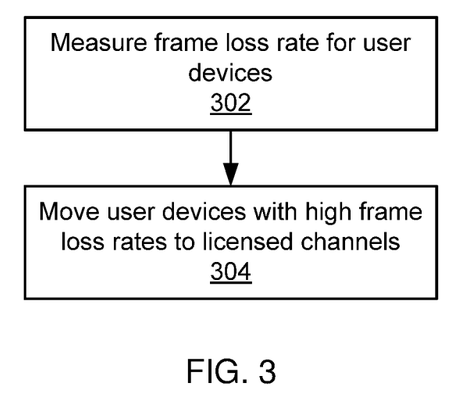
FIG. 3 is a block/flow diagram of a method of resolving interference from hidden WIFI devices in accordance with the present principles.

Referring now to FIG. 3, a method of avoiding interference from hidden WIFI terminals 110 is shown. Block 302 measures the frame loss rate between the LTE base station 102 and the LTE user devices 106. Based on this information, the LTE base station 102 can determine which LTE user devices 106 have a high frame loss rate (e.g., a loss rate above a threshold) and move those devices 106 to licensed channels in block 304 to remove them from the potential interference of a hidden WIFI terminal 110. When scheduling, block 304 sorts the LTE user devices 106 according to frame loss rate and preferentially schedules the user devices 106 having low loss rates in the unlicensed channels, with any remaining (and hence, high-loss) devices 106 being scheduled in the licensed channels.

Carrier sense multiple access (CSMA) is used in WIFI to prevent collision and is influenced by the contention window and backoff policies. However, WIFI CSMA policies cannot be directly applied to LTE systems. The WIFI channel access probability is governed by the maximum and minimum contention window sizes, $W_{max}$ and $W_{min}$ respectively. The actual size of the contention window, $W$, lies in the range $[W_{max}, W_{min}]$. A WIFI device waits for a random backoff duration of b that is chosen with uniform probability from $[0, W]$ before transmitting a frame.

Existing WIFI contention window ranges are appropriate for typical WIFI frame sizes. However, the reservation durations of the present embodiments are significantly longer than a WIFI frame. If the contention window ranges remain unchanged, the LTE base station 102 would occupy an unfair share of the channel, leading to starvation of the WIFI devices. Furthermore, with multiple LTE user devices 106 being scheduled within a single LTE frame, the probability that at least one LTE user device 106 experiences a collision is significantly higher. Hence, if the LTE base station 102 backs off upon a single collision, then it would be likely to experience a high incidence of backoffs and thus would be starved of throughput. On the other hand, if the LTE base station 102 only backed off when all LTE user devices 106 experienced collisions, then the LTE base station 102 would be over-aggressive in contending for the channel, leading to WIFI starvation.

To achieve a fair sharing of channel access, the present embodiments scale contention window sizes by a linear factor. Letting the reservation duration be L times the transmit airtime of a WIFI frame, the LTE base station 102 sets its contention window range to $[LW_{min}, LW_{max}]$. The random backoff interval is thus increased to $b \in [0, \overline{W}]$, where $\overline{W} \in [LW_{min}, LW_{max}]$. This linear scaling maintains throughput fairness to WIFI devices.

Similarly, when the LTE base station 102 encounters a collision in any LTE user device 106, the amount by which the backoff window b is increased is made proportional to the fraction of scheduled LTE user devices 106 experiencing collisions. Letting N be the total number of scheduled LTE user devices 106 and $l \leq N$ be the number of these devices 106 that experience collisions during a downlink transmission, the backoff window is increased to $\overline{b} = 2l/Nb$. This maintains fair channel sharing between LTE and WIFI.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
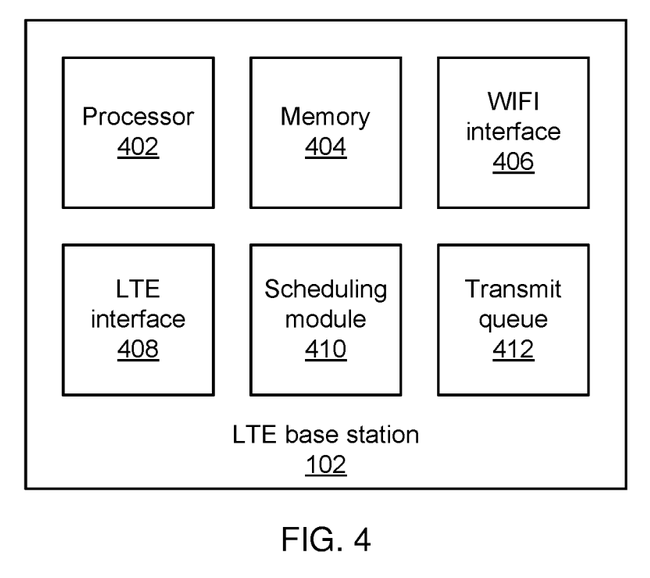
FIG. 4 is a block diagram of a long-term evolution network base station in accordance with the present principles.

Referring now to FIG. 4, a block diagram shows greater detail on the LTE base station 102. The LTE base station 102 includes a hardware processor 402 and memory 404. In addition, the base station 102 includes two wireless interfaces—a WIFI interface 406 and an LTE interface 408. These two interfaces both are capable of communication on the same unlicensed channels. The LTE interface 408 communicates information to one or more LTE user devices 106 in a centralized, synchronized fashion. The WIFI interface 406 may be used solely for the purpose of asynchronously reserving channel access by issuing CTS-to-Self frames that alert other WIFI devices that the channel will be used. In addition, the WIFI interface 406 issues further CTS-to-Self frames during LTE transmission by the LTE interface 406 to extend the reservation and prevent other WIFI devices from attempting to access the channel during gaps in LTE transmission. The LTE base station 102 includes a transmit queue stored in memory 404 that holds frames or packets of information to be transmitted to the LTE user devices 106 via the LTE interface.

In addition, the LTE base station 102 may include one or more functional modules. In particular, a scheduling module 410 may be implemented as software that is stored in memory 404 and executed by processor 402. In an alternative embodiment, the scheduling module 410 may be implemented as one or more discrete hardware components in the form of, e.g., an application specific integrated chip or field programmable gate array. The scheduling module 410 schedules information for transmission to the different user devices 106 within a given LTE transmission. In addition, the scheduling module 410 schedules a break in the LTE transmission in the last subframe of each reservation, instead scheduling three CTS-to-Self frames to be transmitted by the WIFI interface 406 during that last subframe.

Figure 5:
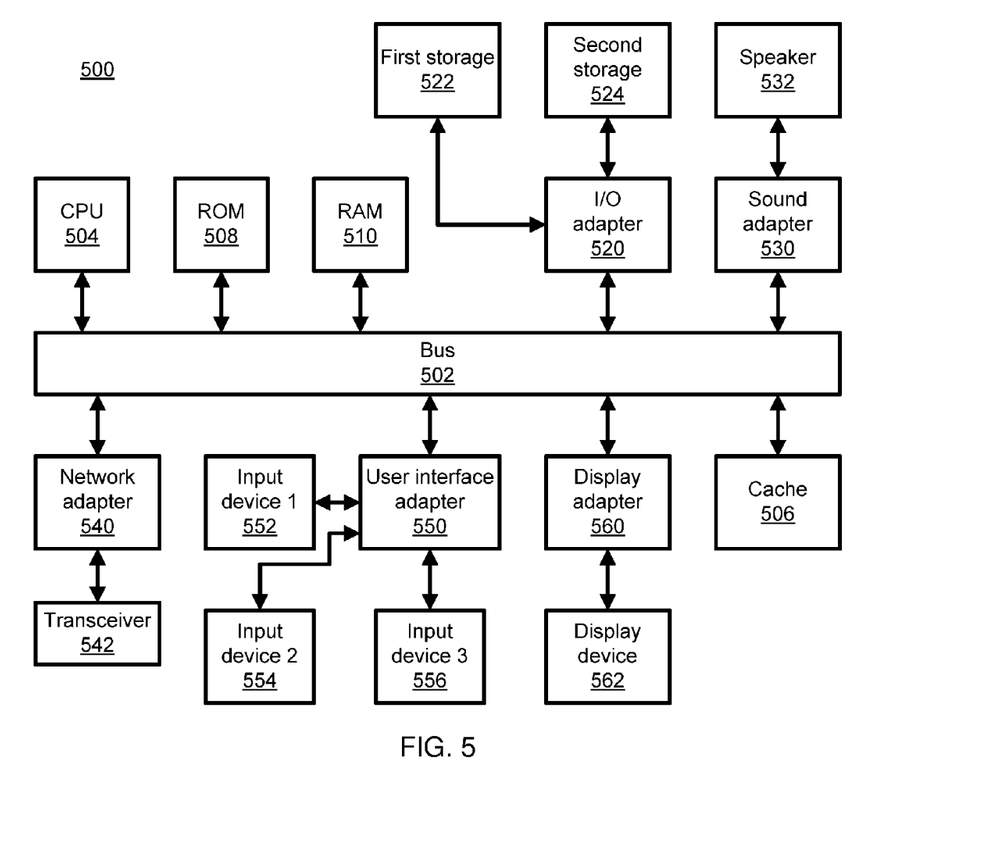
FIG. 5 is a block diagram of a long-term evolution network base station in accordance with the present principles.

Referring now to FIG. 5, an exemplary processing system 500 is shown which may represent the LTE base station 102. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a base station used in a mobile communications system, comprising:
transmitting an initial clear-to-send (CTS)-to-Self packet using a WIFI protocol to prevent other devices that use the WIFI protocol from transmitting during a reserved duration;

activating a carrier using a long-term evolution (LTE) protocol;

transmitting information using the LTE protocol during the reserved duration; and transmitting, during a last subframe of the reserved duration, an additional one or more CTS-to-Self packets using the WIFI protocol to extend the reserved duration, said transmission of the additional CTS-to-Self packets taking place while the carrier using the LTE protocol is still active, wherein said transmission of information and said transmission of additional CTS-to-Self packets are alternated during the extended reserved duration until all information in a transmit queue has been transmitted.

2. The method of claim 1, wherein transmitting the additional CTS-to-Self packet comprises transmitting a plurality of additional CTS-to-Self packets during the last subframe of the reserved duration.

3. The method of claim 2, wherein a number of additional CTS-to-Self packets is dictated by a length of the subframe, a transmission time of the CTS-to-Self packets, and a time gap between LTE reference signals.

4. The method of claim 1, wherein said transmission of information and said transmission of an additional one or more CTS-to-Self packets are repeated until the extended reserved duration exceeds a threshold.

5. The method of claim 4, wherein the threshold is based on a timeout time in the LTE protocol.

6. A base station used in a mobile communications system, comprising:

a first network interface configured to transmit an initial clear-to-send (CTS)-to-Self packet using a WIFI protocol to prevent other devices that use the WIFI protocol from transmitting during a reserved duration and to transmit, during a last subframe of the reserved duration, an additional one or more CTS-to-Self packets using the WIFI protocol to extend the reserved duration; and a second network interface configured to activate a carrier using a long-term evolution (LTE) protocol and to transmit information using the LTE protocol during the reserved duration, wherein the carrier remains active during transmission of the additional CTS-to-Self packets by the first network interface, wherein said transmission of information and said transmission of additional CTS-to-Self packets are alternated during the extended reserved duration until all information in a transmit queue has been transmitted.

7. The base station of claim 6, wherein the first network interface is further configured to transmit a plurality of additional CTS-to-Self packets during the last subframe of the reserved duration.

8. The base station of claim 7, wherein a number of additional CTS-to-Self packets is dictated by a length of the subframe, a transmission time of the CTS-to-Self packets, and a time gap between LTE reference signals.

9. The base station of claim 6, wherein said first and second network interfaces are configured to repeat transmission of information and transmission of an additional one or more CTS-to-Self packets until the extended reserved duration exceeds a threshold.

10. The base station of claim 9, wherein the threshold is based on a timeout time in the LTE protocol.

* * * * *